United States Patent
Shao et al.

(10) Patent No.: US 12,314,048 B2
(45) Date of Patent: May 27, 2025

(54) METHODS AND SYSTEMS FOR REGULATING PIPELINE NETWORK MAINTENANCE BASED ON A SMART GAS INTERNET OF THINGS (IOT)

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Lei He, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/396,628

(22) Filed: Dec. 26, 2023

(65) Prior Publication Data
US 2024/0126253 A1    Apr. 18, 2024

(30) Foreign Application Priority Data
Nov. 27, 2023  (CN) .......................... 202311591859.X

(51) Int. Cl.
*G05B 23/02*          (2006.01)
*G16Y 10/35*          (2020.01)

(52) U.S. Cl.
CPC .......... *G05B 23/0283* (2013.01); *G16Y 10/35* (2020.01)

(58) Field of Classification Search
None
See application file for complete search history.

(56) References Cited

U.S. PATENT DOCUMENTS

| | | | |
|---|---|---|---|
| 2007/0222436 A1* | 9/2007 | Gao | G01N 27/82 324/220 |
| 2008/0125884 A1* | 5/2008 | Schumacher | G05B 23/0286 700/79 |

(Continued)

FOREIGN PATENT DOCUMENTS

| CN | 112101764 A | 12/2020 |
|---|---|---|
| CN | 115496625 A | 12/2022 |

(Continued)

OTHER PUBLICATIONS

First Office Action in Chinese Application No. 202311591859.X mailed on Dec. 29, 2023, 20 pages.

(Continued)

*Primary Examiner* — Jennifer L Norton
(74) *Attorney, Agent, or Firm* — METIS IP LLC

(57) ABSTRACT

The present disclosure provides a method and a system for regulating pipeline network maintenance based on a smart gas Internet of Things (IoT). The method includes obtaining gas data of at least one faulty pipeline, generating at least one set of candidate maintenance schemes based on the at least one faulty pipeline, determining a recommended maintenance approach for the at least one faulty pipeline based on the at least one set of candidate maintenance schemes and the gas data, determining a set of monitoring point locations based on the recommended maintenance approach, and determining a regulation parameter of a regulation device based on monitoring data of the set of monitoring point locations. The system includes a smart gas user platform, a smart gas service platform, a smart gas safety management platform, a smart gas sensing network platform, and a smart gas object platform interacting in sequence.

8 Claims, 5 Drawing Sheets

(56) References Cited

U.S. PATENT DOCUMENTS

| | | | |
|---|---|---|---|
| 2012/0125111 A1 | 5/2012 | Groos et al. | |
| 2012/0323615 A1* | 12/2012 | Johnson | G06Q 10/06311 |
| | | | 705/7.11 |
| 2013/0116941 A1* | 5/2013 | Lie-Nielsen | G01F 15/063 |
| | | | 702/46 |
| 2017/0176390 A1 | 6/2017 | Yu et al. | |
| 2018/0275100 A1* | 9/2018 | Sutherland | G05D 7/0676 |
| 2018/0348080 A1* | 12/2018 | Inoue | G01M 3/243 |
| 2019/0079052 A1 | 3/2019 | Nicolini et al. | |
| 2019/0361767 A1 | 11/2019 | Karthik et al. | |
| 2020/0041035 A1 | 2/2020 | Huang et al. | |
| 2023/0151727 A1* | 5/2023 | Neal, III | F04B 51/00 |
| | | | 166/250.01 |
| 2023/0409008 A1* | 12/2023 | Shao | G06N 3/08 |
| 2023/0417373 A1* | 12/2023 | Shao | F17D 5/005 |
| 2024/0232820 A1* | 7/2024 | Shao | G06Q 10/20 |
| 2024/0249048 A1* | 7/2024 | Shao | G06F 30/28 |
| 2024/0291726 A1* | 8/2024 | Shao | H04L 41/147 |
| 2025/0013991 A1* | 1/2025 | Higuchi | G06Q 10/20 |

FOREIGN PATENT DOCUMENTS

| | | |
|---|---|---|
| CN | 115879913 A | 3/2023 |
| CN | 116011740 A | 4/2023 |
| CN | 116127396 A | 5/2023 |
| CN | 116386287 A | 7/2023 |

OTHER PUBLICATIONS

Wu, Guangchun et al., Research on the Determination of Safe Distance of Buried Pipeline and Its Influencing Factors in Case of Single-Phase Grounding Fault of AC Transmission Line, Materials Protection, 55(S1): 27-33, 2022.

* cited by examiner

METHODS AND SYSTEMS FOR REGULATING PIPELINE NETWORK MAINTENANCE BASED ON A SMART GAS INTERNET OF THINGS (IOT)

CROSS-REFERENCE TO RELATED APPLICATIONS

This application claims the priority of the Chinese Patent Application No. 202311591859.X, filed on Nov. 27, 2023, the entire contents of which are hereby incorporated by reference.

TECHNICAL FIELD

The present disclosure relates to the field of gas pipeline network maintenance, and in particular, relates to a method and a system for regulating pipeline network maintenance based on a smart gas Internet of Things (IoT).

BACKGROUND

When a gas pipeline fails or there is a failure risk, it is necessary to perform gas pipeline maintenance on the gas pipeline in a timely manner so that gas transmission may be resumed as soon as possible to minimize losses. The gas pipeline maintenance may include gas off maintenance and gas on maintenance. During the gas off maintenance, it is necessary to close a valve and a pressure regulator of an associated pipeline, which affects the gas transmission. During the gas on maintenance, there is minimal gas leakage and a lower impact on the gas transmission, however, it comes with a higher cost and greater operational complexity. During a gas pipeline maintenance process, it is essential to consider an actual situation and select an appropriate maintenance approach.

Therefore, it is desired to provide a method and a system for regulating pipeline network maintenance based on a smart gas Internet of Things (IoT), which comprehensively considers the gas pipeline situation, selects the appropriate maintenance approach, and conducts monitoring to ensure maintenance safety, quickly restore gas transmission, and minimize losses.

SUMMARY

One embodiment of the present disclosure provides a method for regulating pipeline network maintenance based on a smart gas Internet of Things (IoT). The method includes obtaining gas data of at least one faulty pipeline. The gas data includes at least one of: a gas flow rate, a gas flow volume, and a pipeline pressure of the at least one faulty pipeline. The method also includes generating at least one set of candidate maintenance schemes based on the at least one faulty pipeline, determining a recommended maintenance approach for the at least one faulty pipeline based on the at least one set of candidate maintenance schemes and the gas data, and determining a set of monitoring point locations based on the recommended maintenance approach. The set of monitoring point locations includes a set of preset point locations and a set of expanded point locations. The method further includes determining a regulation parameter of a regulation device based on monitoring data of the set of monitoring point locations.

One embodiment of the present disclosure provides a system for regulating pipeline network maintenance based on the smart gas Internet of Things (IoT). The system includes a smart gas user platform, a smart gas service platform, a smart gas safety management platform, a smart gas sensing network platform, and a smart gas object platform interacting in sequence. The smart gas safety management platform includes a smart gas emergency maintenance management sub-platform and a smart gas data center. The smart gas sensing network platform is configured to interact with the smart gas data center and the smart gas object platform. The smart gas safety management platform is configured to obtain gas data of at least one faulty pipeline. The gas data includes at least one of a gas flow rate, a gas flow volume, and a pipeline pressure of the at least one faulty pipeline. The smart gas safety management platform is further configured to generate at least one set of candidate maintenance schemes based on the at least one faulty pipeline, determine a recommended maintenance approach for the at least one faulty pipeline based on the at least one set of candidate maintenance schemes and the gas data, and determine a set of monitoring point locations based on the recommended maintenance approach. The set of monitoring point locations includes a set of preset point locations and a set of expanded point locations. The smart gas safety management platform is further configured to determine a regulation parameter of a regulation device based on monitoring data of set of monitoring point locations. The smart gas service platform is configured to send the regulation parameter to the smart gas user platform.

One embodiment of the present disclosure provides a non-transitory computer-readable storage medium storing a computer instruction. When reading the computer instruction in the storage medium, a computer implements the method for regulating pipeline network maintenance based on the smart gas Internet of Things (IoT).

DETAILED DESCRIPTION

Figure 1:
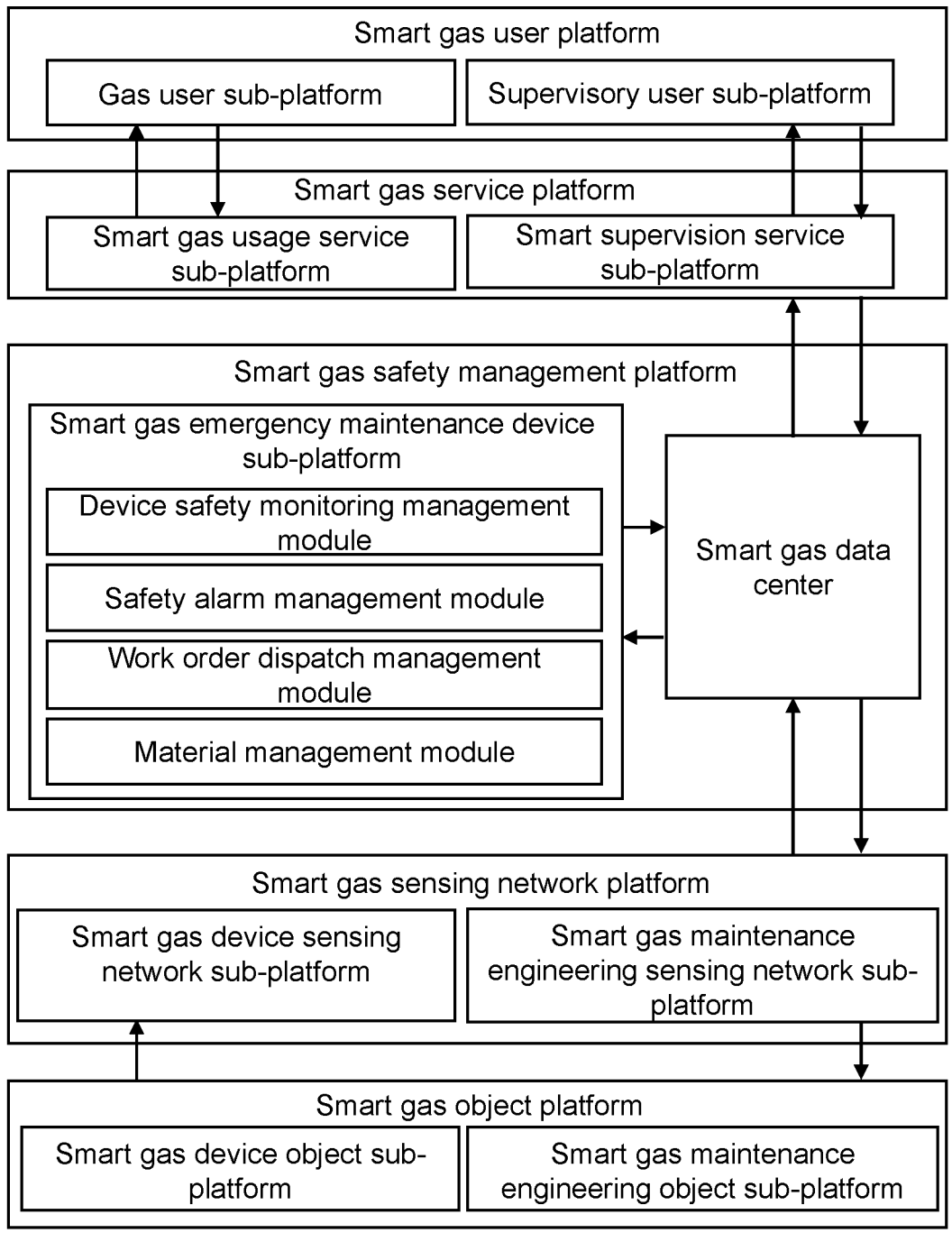
FIG. 1 is a structural diagram of platforms of a system for regulating pipeline network maintenance based on a smart gas Internet of Things (IoT) according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor, unless otherwise indicated or stated in the context, the same reference numerals in the drawings represent the same structures or operations.

Flowcharts are used in the present disclosure to illustrate the steps performed by the system according to the embodiments of the present disclosure. It should be understood that the operations mentioned earlier or later are not necessarily executed in a precise sequence. Instead, they may be processed in reverse order or simultaneously. Other operations may also be added to these processes or certain steps may be removed from these processes.

FIG. 1 is a structural diagram of platforms of a system for regulating pipeline network maintenance based on a smart gas Internet of Things (IoT) according to some embodiments of the present disclosure. The system for regulating pipeline network maintenance based on the smart gas Internet of Things (IoT) related to embodiments of the present disclosure may be described in detail below.

In some embodiments, as shown in FIG. 1, the system for regulating pipeline network maintenance based on the smart gas Internet of Things (IoT) may include a smart gas user platform, a smart gas service platform, a smart gas safety management platform, a smart gas sensing network platform, and a smart gas object platform interacting in sequence.

The smart gas user platform is a platform for interacting with a user. In some embodiments, the smart gas user platform may be configured as a terminal device.

In some embodiments, the smart gas user platform may include a gas user sub-platform and a supervisory user sub-platform.

The gas user sub-platform is a platform that provides a gas user with data related to gas usage and a solution to a gas problem. The gas user is an industrial gas user, a commercial gas user, a general gas user, etc.

The supervisory user sub-platform is a platform for a supervisory user to supervise operation of the entire IoT system. The supervisory user is a person in a safety device department. In some embodiments, the supervisory user sub-platform may receive regulatory information uploaded by the supervisory user and transmit the regulatory information to the smart gas safety management platform. The regulatory information is information recorded by the user on an operating condition of the system.

The smart gas service platform is a platform configured to convey user demand and control information. In some embodiments, the smart gas service platform may obtain gas data, etc., from a smart gas safety management platform (e.g., a smart gas data center) and send the gas data, etc., to the smart gas user platform. The smart gas service platform may be configured to send a regulation parameter to the smart gas user platform.

In some embodiments, the smart gas service platform may include a smart gas usage service sub-platform and a smart supervision service sub-platform. The smart gas usage service sub-platform is a platform that provides a gas service to the gas user. The smart supervision service sub-platform is a platform that provides a supervision need for the supervisory user.

The smart gas safety management platform is a platform that coordinates and harmonizes connection and collaboration between various functional platforms, aggregates all information of the Internet of Things (IoT), and provides functions of perception management and control management for an operation of the IoT.

In some embodiments, the smart gas safety management platform may include a smart gas emergency maintenance device sub-platform and the smart gas data center.

The smart gas emergency maintenance device sub-platform is a platform configured to provide emergency and maintenance service device for the user. In some embodiments, the smart gas emergency maintenance device sub-platform may include, but is not limited to, an device safety monitoring management module, a safety alarm management module, a work order dispatch management module, and a material management module.

The smart gas data center may summarize and store all operational data of the system for regulating pipeline network maintenance based on the smart gas IoT. In some embodiments, the smart gas safety management platform may interact with the smart gas service platform and the smart gas sensing network platform through the smart gas data center.

The smart gas sensing network platform is a functional platform configured to manage a sensing communication. In some embodiments, the smart gas sensing network platform may achieve a function of sensing communication of sensing information and controlling information.

In some embodiments, the smart gas sensing network platform may include a smart gas device sensing network sub-platform, a smart gas maintenance engineering sensing network sub-platform, and the smart gas object platform may obtain operating information of a gas device, a maintenance device, etc., through the smart gas sensing network sub-platform and the smart gas maintenance engineering sensing network sub-platform.

The smart gas object platform is a functional platform for sensing information generation and controlling information execution.

In some embodiments, the smart gas object platform may include a smart gas device object sub-platform and a smart gas maintenance engineering object sub-platform. In some embodiments, the smart gas device object sub-platform may be configured as various types of indoor gas devices of the gas user. In some embodiments, the smart gas maintenance engineering object sub-platform may be configured as various types of gas maintenance-related devices. The smart gas object platform may be configured as various types of gas-related devices. The gas-related devices may include a monitoring device, a regulation device (a pressure regulator, etc.). The monitoring device may include a gas meter, a flow meter, a manometer, a temperature sensor, a humidity sensor, a pressure sensor, etc. Data obtained by the smart gas object platform includes, but is not limited to, a gas flow rate, gas flow volume, a pipeline pressure, etc., and the smart gas object platform may transmit the collected information through the smart gas sensing network platform to the smart gas data center of the smart gas safety management platform.

More details may be found in FIGS. 2 to 5 and the related descriptions thereof.

The system for regulating pipeline network maintenance based on the smart gas IoT may form a closed loop of information operation between the smart gas object platform and the smart gas user platform, and coordinate and operate regularly under a unified management of the smart gas safety management platform, thereby realizing smart and information-based regulation of pipeline network maintenance.

Figure 2:
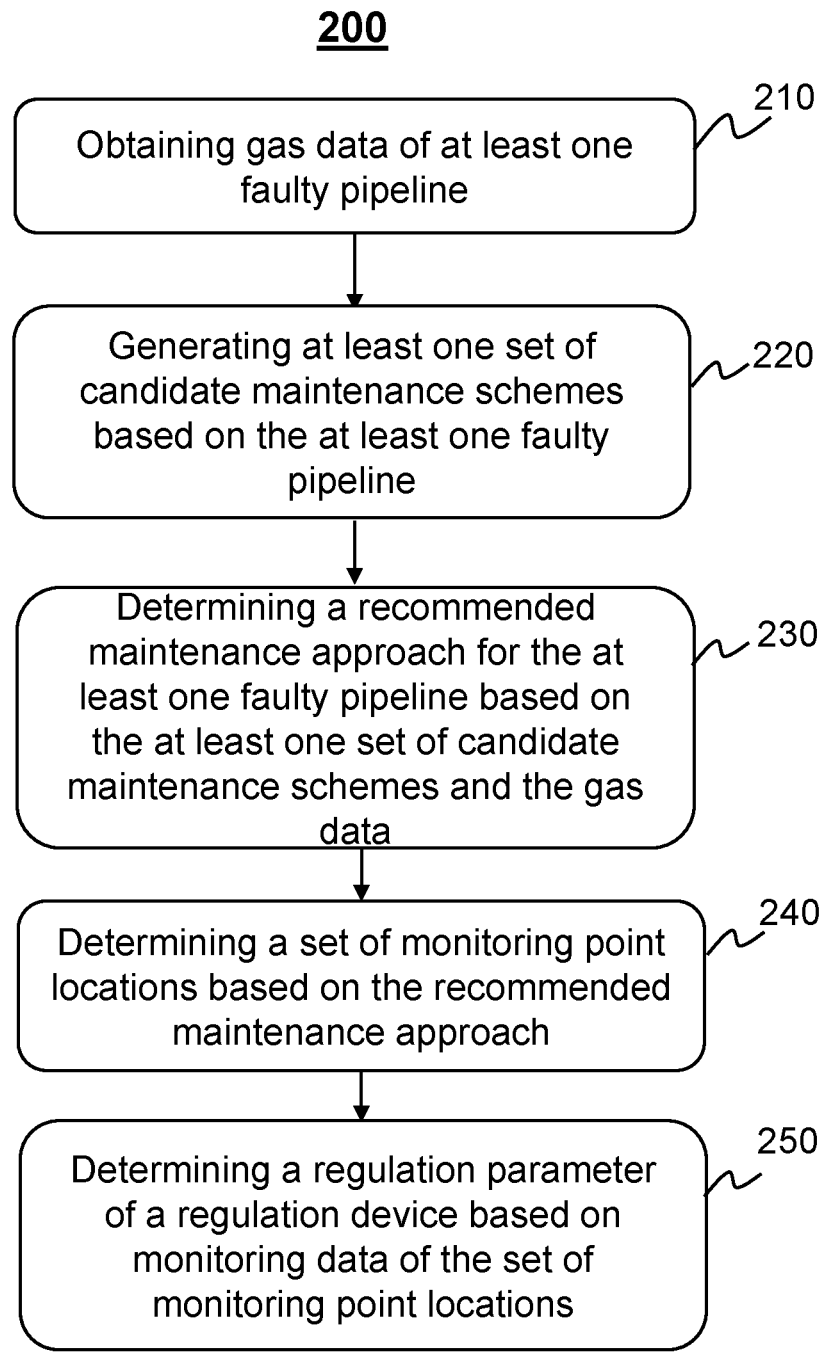
FIG. 2 is a flowchart of an exemplary method for regulating pipeline network maintenance based on a smart gas Internet of Things (IoT) according to some embodiments of the present disclosure.

FIG. 2 is a flowchart of an exemplary method for regulating pipeline network maintenance based on a smart gas Internet of Things (IoT) according to some embodiments of the present disclosure. In some embodiments, a process 200 may be performed by a smart gas safety management platform. As shown in FIG. 2, the process 200 includes the following steps.

In step 210, obtaining gas data of at least one faulty pipeline.

The faulty pipeline refers to a pipeline that may be faulty. For example, the faulty pipeline may include a pipeline with an actually fault and a pipeline with a failure risk. The pipeline with a failure risk refers to a pipeline in which gas data exhibits a significant fluctuation over a period of time.

In some embodiments, the smart gas safety management platform may determine the at least one faulty pipeline in various ways. For example, the smart gas safety management platform may determine whether a faulty pipeline exists based on a change in the gas data transmitted by a smart gas data center over a period of time. For example, if a gas flow rate of a particular gas pipeline rises rapidly over a short period of time, the smart gas safety management platform may determine that the gas pipeline may be the faulty pipeline. In some embodiments, the smart gas safety management platform may obtain regulatory information transmitted by the smart gas user platform through the smart gas service platform, and determine whether a faulty pipeline exists based on the regulatory information. For example, if the regulatory information feeds back that an abnormal condition exists in a certain gas pipeline, the smart gas safety management platform may determine that the gas pipeline is the faulty pipeline.

The gas data refers to data related to gas in the gas pipeline. In some embodiments, the gas data may include at least one of a gas flow rate, a gas flow volume, and a pipeline pressure of the at least one faulty pipeline. The gas flow rate refers to a rate at which the gas flows through the pipeline. The gas flow volume refers to a volume of gas passing through a cross-section of the pipeline within a unit of time. The pipeline pressure refers to a magnitude of an internal pressure within the pipeline. In some embodiments, the gas flow rate, the gas flow rate, and the pipeline pressure may reflect a faulty condition of the at least one faulty pipeline (e.g., a gas leakage condition, etc.).

In some embodiments, the smart gas safety management platform may obtain the gas data of the at least one faulty pipeline in various ways. For example, in response to a determination of the presence of at least one faulty pipeline with a failure risk, the smart gas safety management platform may obtain the gas data from a gas meter, a flow meter, a manometer, and other monitoring devices of the smart gas object platform based on a smart gas sensing network platform.

In step 220, generating at least one set of candidate maintenance schemes based on the at least one faulty pipeline.

The candidate maintenance scheme refers to a candidate scheme to be determined as a maintenance scheme for the at least one faulty pipeline. In some embodiments, a plurality of sets of candidate maintenance schemes may be provided, and each of the plurality of sets of candidate maintenance schemes may include numbered data of the at least one faulty pipeline and a corresponding maintenance approach for the at least one faulty pipeline.

The numbered data of the at least one faulty pipe is a unique identification code that may represent the at least one faulty pipeline. The smart gas data center may pre-store the numbered data of all gas pipelines.

The maintenance approach may include at least one of a non-stop transmission with pressure maintenance approach, and a stop transmission maintenance approach. The non-stop transmission with pressure maintenance approach refers to performing the maintenance without shutting down a pipeline and a valve related to the maintenance. The shutdown maintenance approach refers to performing the maintenance by shutting down the pipeline and the valve related to the maintenance.

In some embodiments, the smart gas safety management platform may generate the at least one set of candidate maintenance schemes in various ways. For example, the smart gas safety management platform may randomly generate the at least one set of candidate maintenance schemes based on a count of the at least one faulty pipeline. For example, two faulty pipelines may be provided, and the smart gas safety management platform may generate four candidate maintenance schemes. The four candidate maintenance schemes may be a permutation of the numbered data (1 and 2) of the two faulty pipelines and the two types of maintenance approaches (e.g., the non-stop transmission with pressure maintenance approach and the stop transmission maintenance approach).

In some embodiments, the smart gas safety management platform may construct a fault feature vector based on the numbered data, a fault type, and the gas data of the at least one faulty pipeline, and determine the at least one set of candidate maintenance schemes based on the fault feature vector via a first vector database. The fault type refers to a type of problem generated by the at least one faulty pipeline. For example, the fault type may be overheating failure, external erosion, stress damage, gas leakage, etc. In some embodiments, the fault type may be preset or determined manually.

The fault feature vector may be a three-dimensional (3D) vector. For example, the fault feature vector may be denoted as $[(x_i, y_i, z_i), i=1 \ldots n]$, wherein $x_i$ denotes the numbered data of the at least one faulty pipeline, $y_i$ denotes the fault type of the at least one faulty pipeline, $z_i$ denotes the gas data, and n denotes the count of the at least one faulty pipeline.

The first vector database includes a plurality of first historical vectors and historical maintenance schemes corresponding to the plurality of first historical vectors. The first historical vectors consists of the numbered data, the fault type, and historical gas data of the at least one faulty pipeline. In some embodiments, the smart gas safety management platform may determine a first historical vector that meets a preset requirement from the first vector database as a first reference vector based on the fault feature vector, and determine the historical maintenance schemes corresponding to the first reference vector as the at least one set of candidate maintenance schemes. The preset requirement may be a judgment condition for determining the first reference vector. In some embodiments, the preset requirement may include a vector distance being less than a distance threshold, the vector distance being minimized, or the like.

In some embodiments, determining the at least one set of candidate maintenance schemes based on the fault feature vector using the first vector database can simplify a screening process of the at least one set of candidate maintenance schemes, and generate the at least one set of candidate maintenance schemes that match the at least one faulty pipeline in a faster and more accurate way.

In step 230, determining a recommended maintenance approach for the at least one faulty pipeline based on the at least one set of candidate maintenance schemes and the gas data.

The recommended maintenance approach refers to a determined candidate maintenance scheme for maintenance of the at least one faulty pipeline.

In some embodiments, the smart gas safety management platform may determine the recommended maintenance approach in various ways. For example, the smart gas safety management platform may determine a candidate maintenance scheme that contains a maximum count of the non-stop transmission with pressure maintenance approaches as the recommended maintenance approach. The use of the non-stop transmission with pressure maintenance approach enables a flow of gas during maintenance and reduces an impact of the maintenance on lives of residents, which has less pollution to the environment.

In some embodiments, the smart gas safety management platform may predict future pipeline data of the at least one faulty pipeline at a future time point based on a first pipeline network graph and the at least one set of candidate maintenance schemes via a prediction model, and determine the recommended maintenance approach based on the future pipeline data and a preset fault condition. More details may be found in FIG. 3 and the related descriptions thereof.

In step 240, determining a set of monitoring point locations based on the recommended maintenance approach.

The set of monitoring point locations refers to a collection of point locations from which monitoring data of gas is collected. The monitoring data collected from the set of monitoring point locations may be a good reflection of at least one of the gas data of the at least one faulty pipeline, a situation of the maintenance process, etc. In some embodiments, the set of monitoring point locations may include a set of preset point locations, a set of expanded point locations, etc. The set of preset point locations is a collection of pre-determined locations for collecting the monitoring gas data, which may be determined either manually or by pre-determination. The set of expanded point locations is a collection of monitoring point locations that are subsequently added. The smart gas safety management platform may determine the set of expanded point locations based on a relevant circumstance of the at least one faulty pipeline. More details of determining the set of expanded point locations may be found in FIG. 5 and the related descriptions thereof.

In some embodiments, the smart gas safety management platform may determine the set of monitoring point locations based on the recommended maintenance approach. For example, in the non-stop transmission with pressure maintenance approach, gas data downstream of the at least one faulty pipeline is more reflective of a maintenance condition than gas data upstream of the at least one faulty pipeline. That is, monitoring point locations located downstream are more important. In order to continuously monitor the gas data located downstream of the at least one faulty pipeline, the smart gas safety management platform may determine point locations downstream of the at least one faulty pipeline as the set of monitoring point locations. For another example, the smart gas safety management platform may determine at least one point location in a downstream pipeline, an upstream pipeline, a parallel pipeline, etc., of the at least one faulty pipeline as the set of monitoring point locations based on an actual need.

Step 250, determining a regulation parameter of a regulation device based on monitoring data of the set of monitoring point locations.

The monitoring data is gas data that is collected at the set of monitoring point locations. The monitoring data may be related to the maintenance approach. For example, when the maintenance approach is the non-stop transmission with pressure maintenance approach, the monitoring data may include the gas flow rate, the gas flow rate, the pipeline pressure, etc. As another example, when the maintenance approach is the stop transmission maintenance approach, the monitoring data may be the pipeline pressure. In some embodiments, the smart gas safety management platform may obtain, in real time or intermittently, the monitoring data from a plurality of gas meters, flow meters, pressure gauges, etc., configured by the smart gas object platform.

By collecting the monitoring data from the set of monitoring point locations instead of collecting the gas data from all sets of point locations, an amount of calculations related to the monitoring data may be reduced, which helps the smart gas safety management platform to realize an effect of real-time regulation.

The regulation device is a device that regulates the gas data of the at least one faulty pipeline and the gas data of a related pipeline in real time. The related pipeline is at least one of an upstream pipeline, a downstream pipeline, a parallel pipeline, etc., of the at least one faulty pipeline. Since pressures of connected pipelines affect each other to a certain extent, regulating both the at least one faulty pipeline and the related pipeline can result in a more accurate regulation effect and a safer regulation process. In some embodiments, the regulation device may be a pressure regulator, etc.

The regulation parameter is a parameter by which the regulation device regulates the gas data. During the maintenance process, the smart gas safety management platform may regulate the regulation device by adjusting the regulation parameter. When an error occurs in the maintenance process that prevents regulation through the regulation device, it is necessary to suspend the maintenance process and re-determine the recommended maintenance approach. For example, the smart gas safety management platform may modify the recommended maintenance approach from the non-stop transmission with pressure maintenance approach to the stop transmission approach.

In some embodiments, the smart gas safety management platform may determine the regulation parameter based on data (e.g., the monitoring data of the set of monitoring point locations) transmitted by the smart gas data center and send the regulation parameter to the smart gas object platform based on the smart gas sensing network platform. The smart gas safety management platform may perform real-time regulation on the regulation device.

In some embodiments, the maintenance process of the non-stop transmission with pressure maintenance approach may include pre-maintenance regulation, in-maintenance regulation, and post-maintenance regulation. The in-maintenance regulation may include blocking the pipeline and performing the maintenance. The pre-maintenance regulation refers to adjusting the gas flow rate and the pipeline pressure of the at least one faulty pipeline to meet a maintenance standard through regulation. The post-maintenance control refers to adjusting the gas flow rate and the pipeline pressure of the maintained at least one faulty pipeline to return to a normal threshold through regulation. The maintenance standard and the normal threshold may be determined manually or preset. More details about the in-maintenance regulation may be found in FIG. 4 and relevant descriptions thereof.

In some embodiments, the smart gas safety management platform may determine a construction scheme based on the recommended maintenance approach, and determine the regulation parameter based on a second pipeline network graph through a regulation parameter determination model. More details may be found in FIG. 4 and the related descriptions thereof.

In some embodiments of the present disclosure, based on the gas data of the at least one faulty pipeline, the recommended maintenance approach is determined to minimize an impact of the maintenance process on gas transmission while ensuring safety of the recommended maintenance approach, thus realizing green gas maintenance. By monitoring and regulating in real time, a fault tolerance rate is increased for the maintenance process, and efficiency of the maintenance process is improved, thereby facilitating prompt restoration of the gas transmission and loss reduction.

Figure 3:
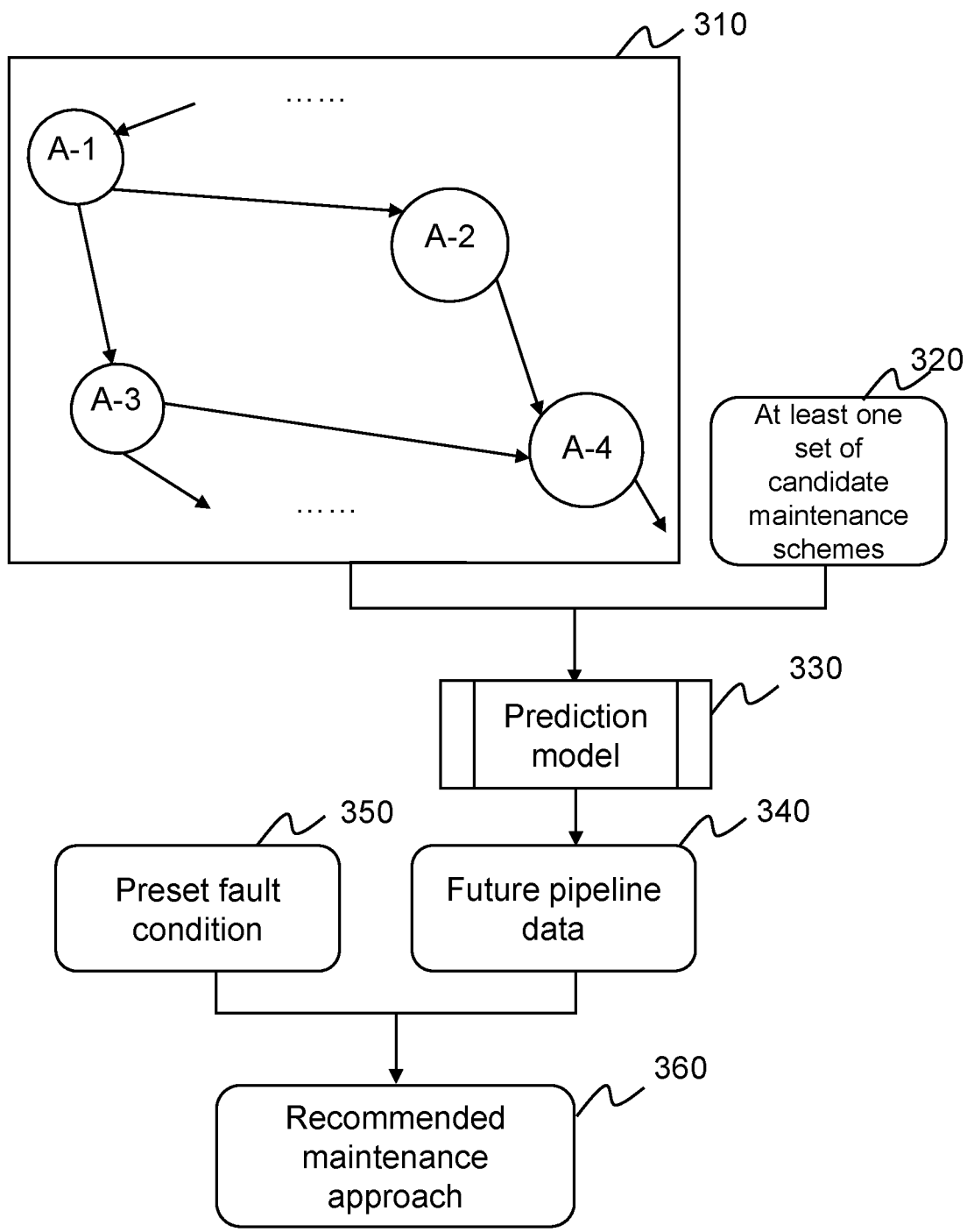
FIG. 3 is a schematic diagram of an exemplary process for determining a recommended maintenance approach through a prediction model according to some embodiments of the present disclosure.

FIG. 3 is a schematic diagram of an exemplary process for determining a recommended maintenance approach through a prediction model according to some embodiments of the present disclosure.

In some embodiments, a smart gas safety management platform may predict future pipeline data 340 of at least one faulty pipeline at a future time point through a prediction model 330 based on a first pipeline network graph 310 and at least one set of candidate maintenance schemes 320, and determine a recommended maintenance approach 360 based on the future pipeline data 340 and a preset fault condition 350. More details about the recommended maintenance approach may be found in FIG. 2 and the relevant descriptions thereof.

The prediction model 330 refers to a model used to determine the future pipeline data. The prediction model may be a machine learning model. For example, the prediction model may be any one of a neural networks (NN) model, a graph neural networks (GNN) model, etc., or a combination thereof.

In some embodiments, an input of the prediction model may include the first pipeline network graph 310 and the at least one set of candidate maintenance schemes 320, and an output of the prediction model may include the future pipeline data 340 of the at least one faulty pipeline at a future time point. One candidate maintenance scheme may correspond to a set of future pipeline data of the at least one faulty pipeline at the future time point. More details about the at least one set of candidate maintenance schemes may be found in FIG. 2 and the relevant descriptions thereof.

The first pipeline network graph 310 refers to a graph that may represent a connection relationship of gas pipelines in a gas pipeline network. The first pipeline network graph may include a node and an edge.

In some embodiments, the node of the first pipeline network graph may correspond to the gas pipelines in the gas pipeline network, with one node corresponding to one gas pipeline. As shown in the first pipeline network graph 310, gas pipeline node A-1, gas pipeline node A-2, gas pipeline node A-3, and gas pipeline node A-4 are nodes of corresponding gas pipelines. A node feature of the first pipeline network graph may include at least one of gas data, a gas pipeline feature, environmental data, maintenance data, a fault type, and a maintenance approach in the at least one set of candidate maintenance schemes. More details about the gas data and the fault type may be found in FIG. 2 and the relevant descriptions thereof. The gas pipeline feature refers to feature data such as an internal diameter, an external diameter, a material, a usage time, etc., of the gas pipeline. The maintenance data may be at least one of maintenance records data or fault records data. In some embodiments, the smart gas safety management platform may obtain the gas pipeline feature and the maintenance data from a smart gas data center. The environmental data may include data related to an environment. For example, the environmental data may include an environmental temperature, an environmental humidity, etc. In some embodiments, the smart gas safety management platform may obtain the environmental data from a temperature sensor and a humidity sensor that is configured by a smart gas object platform via a smart gas sensing network platform. For a gas pipeline that has not experienced any faults, the fault type and the maintenance data in the node feature may be set to null.

In some embodiments, the edge of the first pipeline network graph may correspond to an actual connection relationship between the gas pipeline nodes. For example, if there is a connection between two gas pipelines, the two gas pipelines are connected by an edge. The edge may be a directed edge, with a direction of the edge indicating a direction of gas flow. An edge feature may reflect a relevant feature between the corresponding gas pipelines. For example, the edge feature may include a distance between the corresponding gas pipelines.

In some embodiments, one candidate maintenance scheme may correspond to one first pipeline network graph. The smart gas safety management platform may respectively construct the at least one set of candidate maintenance schemes, with each of the at least one set of candidate maintenance schemes corresponding to one first pipeline network graph.

The future pipeline data 340 refers to predicted data related to the at least one faulty pipeline corresponding to the at least one set of candidate maintenance schemes at a future time point. The future time point is a predicted point of time in future when the corresponding candidate maintenance scheme is to be implemented. In some embodiments, the smart gas safety management platform may select the predicted time point for maintenance of the at least one faulty pipeline as the future time point. In some embodiments, the future pipeline data may include predicted maintenance fault data. The predicted maintenance fault data may include a maintenance fault type of the at least one faulty pipeline and a maintenance fault probability of the maintenance fault type. The maintenance fault type refers to a type of fault that may occur when the corresponding candidate maintenance scheme is implemented, and the maintenance fault probability refers to a probability of an existence of the corresponding maintenance fault type in the faulty pipeline.

In some embodiments, the prediction model may be trained using a plurality of first training samples with a first label. The smart gas safety management platform may input the plurality of first training samples with the first label into an initial prediction model, construct a loss function based on the first label and a result of the initial prediction model, and iteratively update a parameter of the initial prediction model based on the loss function. The model training is terminated when the loss function of the initial prediction model satisfies a preset condition and a trained prediction model is obtained. The preset condition may be the loss function converges, a count of iterations reaching a threshold, etc.

In some embodiments, the plurality of first training samples may be obtained based on historical data. The first label of the plurality of first training samples may be obtained through manual annotation. In some embodiments, the plurality of first training samples may be historical first pipeline network graphs constructed based on the historical data from a first time period, and the first label may be actual pipeline data of the set of monitoring point locations from a second time period in the historical data. The first time period precedes the second time period, with the second time period being a future time period of the first time period.

In some embodiments, the preset fault condition 350 is a preset criteria for determining the recommended maintenance approach. In some embodiments, the preset fault condition may include a fault threshold. The preset fault condition may be that the maintenance fault probability of each faulty pipeline corresponding to the candidate maintenance scheme is less than the fault threshold. The fault thresholds corresponding to different faulty pipelines may be the same or different, and the smart gas safety management platform may preset the fault threshold based on a specific requirement. The fault threshold is a maximum allowable probability of the at least one faulty pipeline experiencing a fault when determining the recommended maintenance approach.

In some embodiments, the fault thresholds corresponding to different faulty pipelines may be different. In some embodiments, the fault threshold may be related to an importance degree of the at least one faulty pipeline. For example, the fault threshold may be inversely related to the importance degree of the at least one faulty pipeline.

The importance degree of the at least one faulty pipeline refers to a degree of urgency of maintenance of the at least one faulty pipeline. In some embodiments, the importance degree of the at least one faulty pipeline is related to an importance degree of a user. The importance degree of the user may represent an extent to which the user relies on gas usage. The importance degree of the user may be determined by weighting a gas consumption of the user, a ventilation time of the user, and a rating of a community where the user resides. A weighting coefficient may be determined manually or preset. The smart gas safety management platform may obtain the gas consumption of the user, the ventilation time of the user, and the rating of the community where the user resides from the smart gas data center.

The importance degree of the at least one faulty pipeline may be determined based on a pipeline image. In some embodiments, the smart gas safety management platform may construct the pipeline image based on a pipeline route. A node of the pipeline image may include a pipeline node and a user node. The importance degree of the at least one faulty pipeline may be weighted based on the importance degrees of the user corresponding to user nodes of different routes. A weighting coefficient may be a route coefficient of the pipeline image. A larger route coefficient indicates a higher importance degree of the faulty pipeline. The route coefficient is positively related to a route length of the pipeline image and may be determined manually or preset. The route length refers to adjacency between a starting node and an ending node of a route of the pipeline image. The adjacency refers to a count of nodes that need to be traversed in the pipeline image from one node to another node, and the route may follow a direction of an edge of the pipeline image. A plurality of routes may be provided. The longer the route, the greater an impact of a node on subsequent nodes on the route, and the larger the route coefficient.

The smart gas safety management platform may use the above manner to determine the importance degrees of different faulty pipelines and consequently determine the fault threshold corresponding to the at least one faulty pipeline.

Determining the fault thresholds corresponding to different faulty pipelines based on the importance degrees of the faulty pipelines makes the preset fault condition for different faulty pipelines more accurate, aligning well with features of different faulty pipelines, and facilitating more reasonable determination of the recommended maintenance approach subsequently.

In some embodiments, in response to a determination that a count of the maintenance fault type is greater than or equal to two, the smart gas safety management platform may determine the maintenance fault probability of the at least one faulty pipeline based on a preset algorithm.

In some embodiments, the preset algorithm may determine a final maintenance fault probability of the at least one faulty pipeline by weighting the maintenance fault probabilities corresponding to different maintenance fault types of the at least one faulty pipeline. A weighting coefficient may be obtained from a coefficient table. The coefficient table is a table that reflects combinations of maintenance fault types and corresponding coefficients. The smart gas safety management platform may pre-set the coefficient table.

In some embodiments, the smart gas safety management platform may respectively determine the final maintenance fault probability of the at least one faulty pipeline when the count of the maintenance fault type is greater than or equal to two based on the preset algorithm.

In some embodiments, the smart gas safety management platform may determine the recommended maintenance approach based on the maintenance fault probabilities or the final maintenance fault probabilities of all faulty pipelines, along with the preset fault condition. More details about determining the recommended maintenance approach may be found in relevant descriptions below.

By determining the maintenance fault probability of the at least one faulty pipeline with two or more maintenance fault types through the preset algorithm, accuracy of the determined maintenance fault probability of the at least one faulty pipeline can be improved, which is beneficial for determining the recommended maintenance approach more reasonably.

In some embodiments, the smart gas safety management platform may determine the recommended maintenance approach based on the maintenance fault probability in the future pipeline data and the preset fault condition. For example, when the maintenance fault probability of each faulty pipeline corresponding to the candidate maintenance scheme meets the preset fault condition, the smart gas safety management platform may designate a candidate maintenance scheme that meets the preset fault condition as the recommended maintenance approach. As another example, when a plurality of candidate maintenance schemes meet the preset fault condition, a candidate maintenance scheme that contains a maximum count of non-stop transmission with pressure maintenance approaches may be chosen as the recommended maintenance approach.

Predicting the future pipeline data and fully considering the preset fault condition facilitate a more reasonable selection of the recommended maintenance approach. When the maintenance fault probability of the at least one faulty pipeline meets the preset fault condition, prioritizing the candidate maintenance scheme containing the maximum count of the non-stop transmission with pressure maintenance approaches helps to minimize an impact on gas transmission and reduce losses while ensuring maintenance safety.

Figure 4:
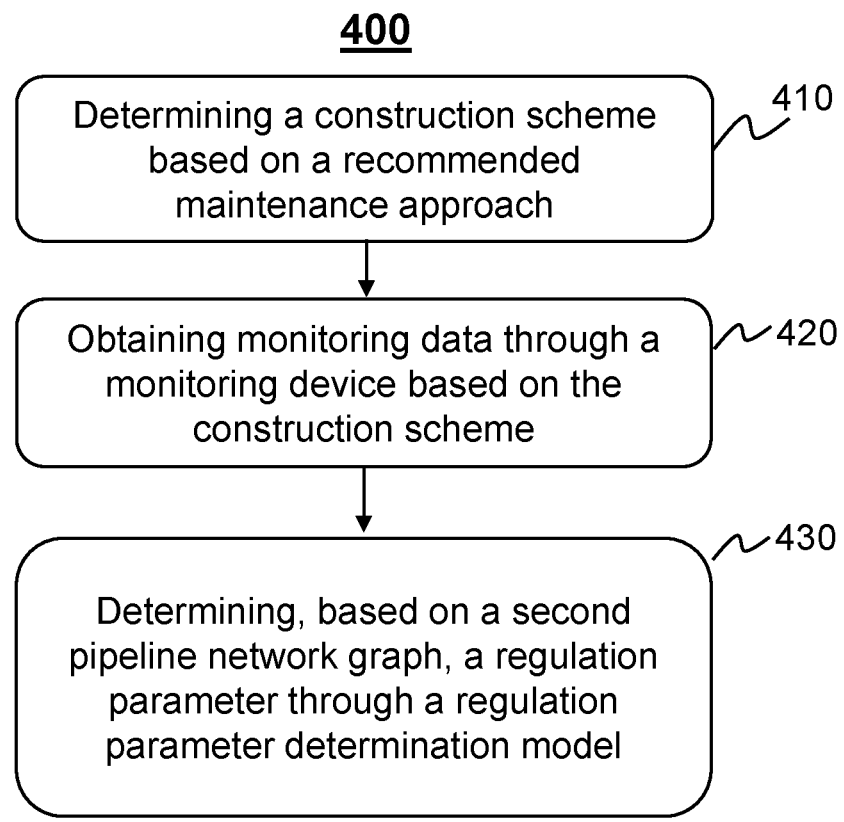
FIG. 4 is a flowchart of an exemplary process for determining a control parameter according to some embodiments of the present disclosure.

FIG. 4 is a flowchart of an exemplary process for determining a control parameter according to some embodiments of the present disclosure. As shown in FIG. 4, a process 400 is executed by a smart gas safety management platform and includes the following steps.

In step 410, determining a construction scheme based on a recommended maintenance approach.

The construction scheme refers to a specific implementation scheme for maintenance of a fault in at least one pipeline. In some embodiments, the construction scheme includes at least one of construction duration, a specific point location of pipeline construction, a set of preset point locations, etc. The specific point location of pipeline construction refers to a specific location of construction, which may be represented as a distance from the specific location of construction to a particular pipeline. More details about the set of preset locations may be found in FIG. 2 and the related descriptions thereof.

The smart gas safety management platform may determine the construction scheme in various ways. For example, the smart gas safety management platform may establish a preset table based on a corresponding relationship between the recommended maintenance approach and the construction scheme and determine the construction scheme by looking up the preset table. In some embodiments, the smart gas safety management platform may construct a construction feature vector based on at least one of a gas pipeline feature, the recommended maintenance approach, an estimated maintenance difficulty, etc., and perform vector matching based on a second vector database to determine the construction scheme. The second vector database includes a plurality of second historical vectors and historical construction schemes corresponding to the plurality of second historical vectors. Each of the plurality of second historical vectors includes a historical gas pipeline feature, a historical maintenance approach, and a historical maintenance difficulty. In some embodiments, the smart gas safety management platform may retrieve the construction scheme from the second vector database based on the construction feature vector. The manner of determining the construction scheme through the second vector database is similar to the way of determining the candidate maintenance scheme through the first vector database. More details may be found in FIG. 2 and the relevant descriptions thereof.

More details about the gas pipeline feature and the recommended maintenance approach may be found in FIG. 2 and FIG. 3 and the related descriptions thereof.

The estimated maintenance difficulty refers to an estimated difficulty of maintenance of a faulty gas pipeline. In some embodiments, the estimated maintenance difficulty may be obtained by looking up a manually preset maintenance difficulty table. The maintenance difficulty table is established by a professional through a comprehensive assessment based on a maintenance fault type, a surrounding geographical environment, etc.

In some embodiments, before implementing the construction scheme, the smart gas safety management platform may determine whether a regulation device operates normally based on historical gas data. More details about the regulation device may be found in FIG. 1 or FIG. 2 and the related descriptions thereof.

In some embodiments, gas data (e.g., a pipeline pressure, a gas flow rate, a gas volume, etc.) of a gas pipeline is periodic. For example, gas data corresponding to a peak period of gas usage and an off-peak period of gas usage are different.

In some embodiments, the smart gas safety management platform may determine whether the regulation device operates normally in a current time period by comparing the gas data of the current time period with historical gas data of a same time period (e.g., the peak period) in the past, using an anomaly detection algorithm (e.g., K-nearest neighbor algorithm (KNN), one-class support vector machine algorithm (One-Class SVM)). For example, the platform may calculate a difference between the gas data of the current time period and the historical gas data. If the calculated difference exceeds a preset difference threshold, the gas data of the current time period is considered anomalous. The difference threshold may be preset manually. In some embodiments, if the gas data corresponding to a particular regulation device is determined as anomalous, then the regulation device is also considered anomalous. The smart gas safety management platform may notify maintenance personnel through a smart gas user platform to inspect and repair the regulation device before maintenance, thereby ensuring that gas data may be controlled normally during a maintenance process.

In some embodiments described in the present disclosure, checking the normal operation of the regulation device before implementing the construction scheme ensures that the gas data can be controlled properly during the maintenance process after the construction scheme is executed.

In step 420, obtaining monitoring data through a monitoring device based on the construction scheme.

The monitoring device refers to a device used to collect the gas data from the gas pipeline. For example, the monitoring device may be a flow meter, a pressure sensor, etc. More details about the monitoring device may be found in FIG. 1 and the relevant descriptions thereof.

More details about the monitoring data may be found in FIG. 2 and the relevant descriptions thereof.

In some embodiments, during an actual construction process of implementing the construction scheme, the smart gas safety management platform may obtain the monitoring data in real-time through the monitoring device.

In step 430, determining, based on a second pipeline network graph, a regulation parameter through a regulation parameter determination model. The regulation parameter may include an adjustment parameter of at least one regulation device (e.g., a pressure regulator, etc.). For example, the regulation parameter may include reducing pressure by 50 Pa for pressure regulator 1. More details about the regulation parameter may be found in FIG. 2 and the related descriptions thereof.

The second pipeline network graph refers to a graph that represents a relationship between the gas pipeline, the monitoring device, the regulation device, etc.

In some embodiments, the second pipeline network graph includes a node and an edge. A node includes the gas pipeline node, the monitoring device, and the regulation device, and a node feature includes a gas pipeline node feature, a monitoring device node feature, and a regulation device node feature.

The gas pipeline node feature includes environmental data, the gas pipeline feature, the fault type, the construction scheme, a construction time, etc. More details about the environmental data, the gas pipeline feature, and the fault type may be found in FIG. 2 or FIG. 3 and the related descriptions thereof. More details about the construction scheme may be found in FIG. 4 and the related descriptions thereof.

The construction time refers to a cumulative construction time from a start of construction to a current time point. In some embodiments, the construction time may be obtained by the smart gas safety management platform based on data from a smart gas data center.

The monitoring device node feature includes the monitoring data, a type of the monitoring device, a location of the monitoring device, an adoption identifier, etc. The monitoring device node may correspond to the set of preset locations. More details about the monitoring data may be found in FIG. 2 and the relevant descriptions thereof. The type of the monitoring device refers to different types of the monitoring device categorized based on a type of monitored data. For example, the type of the monitoring device may include a temperature sensor, a pressure sensor, etc. The location of the monitoring device refers to a location of the monitoring device on the gas pipeline. The adoption identifier indicates whether the monitoring data collected by the monitoring device is used. The adoption identifier may have values of 1 and 0, 1 signifies that the monitoring data collected by that device is used for a model calculation, and 0 signifies that the data collected by that device is not used for the model calculation.

The regulation device node feature includes a location of the regulation device, an operation parameter of the regulation device, etc. The location of the regulation device refers to a location of the regulation device on the gas pipeline. The operation parameter of the regulation device refers to a current parameter at which the regulation device is operating.

In some embodiments, the smart gas safety management platform may obtain the monitoring data, the type of the monitoring device, the location of the monitoring device, the adoption identifier, the location of the regulation device, the operation parameter of the regulation device, etc., through the smart gas data center.

The edge represent a relationships between the nodes. In some embodiments, the edge may be categorized into a first-class edge, a second-class edge, and a third-class edge, and the edge may be a directed edge. The first-class edge includes a connection relationship between the gas pipelines. A direction of the first-class edge signifies a direction of gas flow within the gas pipelines. An edge feature of the first-class edge represent a distance between the gas pipeline nodes. The second-class edge includes a connection relationship between the monitoring device and the gas pipelines, and an edge feature of the second-class edge represent a monitoring relationship between the monitoring device and the gas pipelines. The third-class edge represents a connection relationship between the regulation device and the gas pipelines, and an edge feature of the third-class edge represents a regulation relationship between the regulation device and the gas pipelines.

In some embodiments, the smart gas safety management platform may construct the second pipeline network graph based on the gas pipelines, the monitoring device, the regulation device, etc.

As shown in the second pipeline network graph 510, gas pipeline node B-1, gas pipeline node B-2, gas pipeline node B-3, gas pipeline node B-4, monitoring device node C-1, and regulation device D-1 are all nodes. The edge may connect the nodes. For example, edge 511 represents the connection relationship between the gas pipelines B-2 and B-3, edge 512 represents the monitoring device C-1 monitoring the gas pipeline B-4, and edge 513 represents the regulation device D-1 regulating the gas pipeline B-1.

In some embodiments, the regulation parameter determination model 520 is a machine learning model. For example, the regulation parameter determination model 520 may be any one of a neural networks (NN) model, a graph neural networks (GNN) model, etc., or any combination thereof.

In some embodiments, an input of the regulation parameter determination model includes the second pipeline network graph, and an output of the regulation parameter determination model includes the regulation parameter or a preset identifier.

In some embodiments, at regular intervals, the smart gas safety management platform uses the regulation parameter determination model to determine the regulation parameter and achieve real-time regulation of the regulation device. Duration of the intervals may be preset.

In some embodiments, the regulation parameter determination model may be trained using a second training sample with a second label. The second training sample includes a sample second pipeline network graph, and the second label includes an actual regulation parameter and the preset identifier corresponding to the second training sample. The obtaining of the second label may be referred to as the obtaining of the fourth label. More details may be found in FIG. 5 and the related descriptions thereof. A training process for the regulation parameter determination model may be found in the training process of the prediction model as described in FIG. 3.

In some embodiments, the regulation parameter determination model includes a point location determination layer and a regulation determination layer. More details may be found in FIG. 5 and the related descriptions thereof.

In some embodiments, the output of the regulation parameter determination model includes the preset identifier. If the output of the regulation parameter determination model is the preset identifier, the smart gas safety management platform may suspend the construction scheme and re-determine the recommended maintenance approach.

The preset identifier is a manually preset symbol that indicates an exceedance of the regulation device's regulation capacity. For example, the preset identifier may be a warning message with an alert implication. Outputting the preset identifier signifies that the current regulation device is unable to regulate the gas data to meet a safety condition, and continuing construction poses a higher risk of danger.

In some embodiments, if the output of the regulation parameter determination model is the preset identifier, the smart gas safety management platform may re-determine the recommended maintenance approach based on the candidate maintenance scheme and the gas data. More details may be found in FIG. 2 and the related descriptions thereof.

In some embodiments, if the output of the regulation parameter determination model is the preset identifier, the smart gas safety management platform may also suspend the construction scheme and recommend a cessation of gas transmission for maintenance.

In some embodiments described in the present disclosure, when the gas data exceeds a regulation range of the regulation device, and the output of the regulation parameter determination model is the preset identifier, suspending the construction scheme and re-determining the recommended maintenance approach can enhance the safety of the maintenance process for a gas pipeline network.

In some embodiments described in the present disclosure, the smart gas safety management platform determines the construction scheme, constructs the second pipeline network graph, and determines the regulation parameter based on the recommended maintenance approach by using the regulation parameter determination model. This approach can improve an accuracy of a determined regulation parameter. Real-time monitoring and regulation of the gas pipelines during the maintenance process ensures the safety of the maintenance process, facilitates the swift resumption of gas transmission, and reduces losses.

Figure 5:
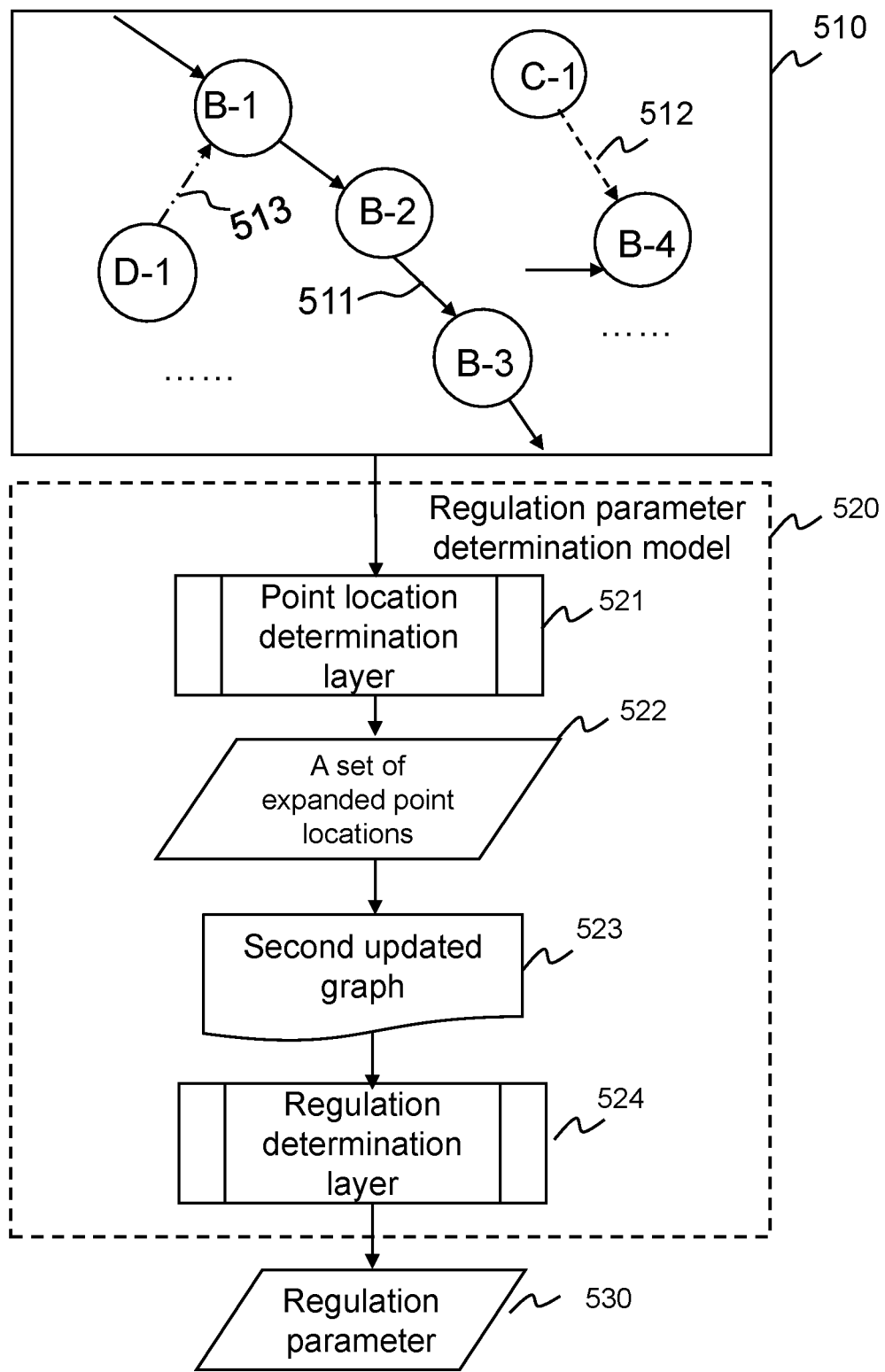
FIG. 5 is a schematic diagram of an exemplary regulation parameter determination model according to some embodiments of the present disclosure.

FIG. 5 is a schematic diagram of an exemplary regulation parameter determination model according to some embodiments of the present disclosure.

In some embodiments, as shown in FIG. 5, the regulation parameter determination model 520 includes a point location determination layer 521 and a regulation determination layer 524. A smart gas safety management platform may use the point location determination layer 521 to determine a set of expanded point locations 522 based on the second pipeline network graph 510. The smart gas safety management platform may then use the set of expanded point locations 522 to determine a second updated graph 523. Based on the second updated graph 523, the regulation parameter determination model determines the regulation parameter 530 through the regulation determination layer 524.

The point location determination layer 521 may be used to determine the set of expanded point locations 522. In some embodiments, the point location determination layer is a machine learning model. For example, point location determination layer 521 may be any one of a neural networks (NN) model, a graph neural networks (GNN) model, etc., or any combination thereof.

More details about the set of expanded point locations may be found in FIG. 2 and the related descriptions thereof.

In some embodiments, an input of the point location determination layer 521 includes the second pipeline network graph 510, and an output of the point location determination layer 521 includes the set of expanded point locations 522. More details about the second pipeline network graph may be found in FIG. 4 and the related descriptions thereof.

In some embodiments, the point location determination layer 521 may be trained using a plurality of third training samples with a third label. A training process of the point location determination layer may be referred to as the training process of the prediction model. More details may be found in FIG. 3 and the related descriptions thereof.

In some embodiments, the plurality of third training sample include sample second pipeline network graphs, and the third label is a sample set of monitoring locations. More details about the second pipeline network graph may be found in FIG. 4 and the related descriptions thereof.

In some embodiments, the smart gas safety management platform may preset a plurality of candidate monitoring locations, change gas data, and select a plurality of candidate monitoring locations where a fluctuation of the gas data occurs as the set of sample monitoring locations based on the sample second pipeline network graphs.

In some embodiments, the smart gas safety management platform may use the set of expanded point locations 522 to update the second pipeline network graph and obtain the second updated graph 523.

In some embodiments, the smart gas safety management platform may update an adoption identifier in a node feature of a monitoring device node based on the set of expanded point locations. For example, if a monitoring device is not part of the set of expanded point locations in a previous update but is included in a current update, then the adoption identifier corresponding to the monitoring device changes from 0 to 1. Conversely, if the monitoring device is in the set of expanded point locations in the previous update but is not included in the current update, the adoption identifier corresponding to the monitoring device changes from 1 to 0.

The regulation determination layer 524 may be used to determine the regulation parameter 530. More details about the regulation parameter may be found in FIG. 2 and the related descriptions thereof.

In some embodiments, an input of the regulation determination layer 524 includes the second updated graph 523, and an output of the regulation determination layer 524 includes the regulation parameter 530 and the preset identifier (not shown in the figure). More details about the preset identifier may be found in FIG. 4 and the related descriptions thereof.

In some embodiments, the regulation determination layer 524 may be trained using a plurality of fourth training samples with a fourth label. The training process may be referred to as the training process of the prediction model. More details may be found in FIG. 3 and the related descriptions thereof.

In some embodiments, the plurality of fourth training samples may be sample second updated graphs, and the fourth label may be an actual regulation parameter and the preset identifier.

In some embodiments, obtaining of the plurality of fourth training samples may be referred to as the previous description of obtaining the second updated graph 523.

In some embodiments, the smart gas safety management platform may preset a plurality of candidate regulation parameters based on the sample second updated graphs to select a candidate regulation parameter that meets a safety condition or has minimal fluctuations as the fourth label. If no candidate regulation parameter meets the safety condition, then the fourth label may be the preset identifier (e.g., a text identifier "Exceeds Regulation Capacity").

In some embodiments, during different maintenance stages of the maintenance process, optimal monitoring point locations may be changed. The smart gas safety management platform needs to periodically re-determine the optimal monitoring point locations (the set of expanded point locations) at a first preset interval through the regulation parameter determination model. Real-time regulation is required during the maintenance process, so that the smart gas safety management platform also needs to periodically re-determine the regulation parameter at a second preset interval.

For example, the smart gas safety management platform may update the second pipeline network graph based on the set of expanded point locations at the second preset interval and determine the regulation parameter through the regulation determination layer.

In some embodiments, the first preset interval and the second preset interval may be the same. That is, the determination of the set of expanded point location and the regulation parameter occurs simultaneously. In other embodiments, the first preset interval and the second preset interval may be different. For example, the first preset interval may be 10 minutes, while the second preset interval may be 5 minutes. The smart gas safety management platform may preset the first preset interval and the second preset interval based on an actual requirement to determine the optimal monitoring point locations and adjust the regulation parameter in real-time.

In some embodiments described in the present disclosure, the smart gas safety management platform determines the set of expanded point locations through the point location determination layer based on the second pipeline network graph to supplement monitoring locations, thereby compensating for the inaccuracy in regulation caused by using only the set of preset point locations and effectively increasing the accuracy of the regulation parameter.

In some embodiments, the smart gas safety management platform may determine whether to suspend the construction scheme based on a fluctuation of monitoring data. The fluctuation of the monitoring data refers to a deviation of monitoring data of a current time period from an average of monitoring data of a previous time period and monitoring data of a subsequent time period. More details about the construction scheme may be found in FIG. 4 and the related descriptions thereof.

The fluctuation of the monitoring data may be measured by a variance of the monitoring data. For example, during the maintenance process, the smart gas safety management platform may obtain monitoring data n times denoted as monitoring data 1, monitoring data 2, monitoring data 3, . . . , and monitoring data n, and select a time duration of x. The smart gas safety management platform first calculates the variance of monitoring data 1 to monitoring data x. The variance is calculated in real-time during the data collection process. For example, the calculation may be started after collecting five pieces of monitoring data. If the variance is greater than a preset threshold, it indicates that the fluctuation of the monitoring data during that time period is high. In response to the high fluctuation of the monitoring data, the smart gas safety management platform notifies maintenance personnel to suspend the maintenance process through a smart gas emergency maintenance management sub-platform, thereby allowing the maintenance personnel to wait for the regulation parameter determination model to re-output the regulation parameter or perform a manual inspection. If the variance is less than the preset threshold, the smart gas safety management platform continues to calculate the variance of monitoring data from (1+y) to (x+y) with a step size of y. The preset threshold may be determined based on a specific situation. Accordingly, the smart gas safety management platform may continuously monitor the fluctuation of the monitoring data in real-time during the maintenance process and determine whether to suspend the construction scheme.

The smart gas safety management platform may monitor the fluctuation of the monitoring data in real-time. When the variance of the monitoring data exceeds the preset threshold, the smart gas safety management platform may decide to suspend the construction scheme, thereby compensating for a defect that requires a longer time for the regulation parameter determination model to determine the suspension of the maintenance process, allowing for a quick response to an unexpected situation, and ensuring construction safety.

Some embodiments of the present disclosure provide a non-transitory computer-readable storage medium that stores a computer instruction. When the computer instruction is executed by a computer, the computer implements any of the methods for regulating pipeline network maintenance based on a smart gas Internet of Things (IoT) as described in the present disclosure.

The basic concepts have been described above, and it is apparent to those skilled in the art that the foregoing detailed disclosure is intended as an example only and does not constitute a limitation of the present disclosure. Although not expressly stated herein, those skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

Additionally, unless explicitly stated in the claims, the order of processing elements and sequences, the use of numerical or alphabetical characters, or the use of other names in the present disclosure are not intended to limit the order of the processes and methods. While various examples have been discussed in the disclosure as presently considered useful embodiments of the invention, it should be understood that such details are provided for illustrative purposes only. The appended claims are not limited to the disclosed embodiments, but instead, the claims are intended to cover all modifications and equivalent combinations that fall within the scope and spirit of the present disclosure. For example, although system components described above may be implemented through hardware devices, they may also be implemented solely through software solutions, e.g., installing the described system on existing processing equipment or mobile devices.

Similarly, it should be noted that, for the sake of simplifying the disclosure of the embodiments of the present disclosure to aid in understanding of one or more embodiments, various features are sometimes grouped together in one embodiment, drawing, or description. However, this manner of disclosure is not to be interpreted as requiring more features than are expressly recited in the claims. In fact, the features of various embodiments may be less than all of the features of a single disclosed embodiment.

In closing, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. A method for regulating pipeline network maintenance based on a smart gas Internet of Things (IoT), wherein the method is executed based on a smart gas safety management platform of a system for regulating pipeline network maintenance based on the IoT, the system further comprises a smart gas user platform, a smart gas service platform, a smart gas sensing network platform, and a smart gas object platform; the smart gas safety management platform includes a smart gas emergency maintenance management sub-platform and a smart gas data center; wherein the smart gas sensing network platform is configured to interact with the smart gas data center and the smart gas object platform; the smart gas user platform is configured as a terminal device, the smart gas object platform is configured as various types of gas-related devices, the gas-related devices include a monitoring device and a regulation device; the monitoring device includes a gas meter, a flow meter, a manometer, a temperature sensor, a humidity sensor, and a pressure sensor; the smart gas object platform is configured to transmit collected information through the smart gas sensing network platform to the smart gas data center, the method comprising:

obtaining gas data of at least one faulty pipeline from the gas meter, the flow meter, and the manometer of the smart gas object platform based on the smart gas sensing network platform, wherein the gas data includes at least one of a gas flow rate, a gas flow volume, and a pipeline pressure of the at least one faulty pipeline;

generating at least one set of candidate maintenance schemes based on the at least one faulty pipeline;

predicting future pipeline data of the at least one faulty pipeline at a future time point through a prediction model based on a first pipeline network graph and the at least one set of candidate maintenance schemes, the prediction model being a graph neural networks (GNN); wherein the prediction model is obtained by training based on first training samples and first labels, the first training samples are historical first pipeline network graphs constructed based on historical data from a first time period, and the first labels are actual pipeline data of a set of monitoring point locations in the historical data from a second time period; wherein the first time period precedes the second time period, and the second time period is a future time period of the first time period, and the training includes:
  inputting the first training samples with the first labels into an initial prediction model;
  constructing a loss function based on outputs of the initial prediction model and the first labels; and
  updating parameters of the initial prediction model based on the loss function until meeting preset conditions; and
  obtaining the prediction model;
determining a recommended maintenance approach for the at least one faulty pipeline based on the future pipeline data and a preset fault condition; wherein the recommended maintenance approach includes a non-stop transmission with pressure maintenance approach and a stop transmission maintenance approach; the preset fault condition is a maintenance fault probability of each faulty pipeline corresponding to each candidate maintenance scheme that is less than a fault threshold; the fault threshold is inversely related to an importance degree of the at least one faulty pipeline; wherein the importance degree of the at least one faulty pipeline is determined based on a pipeline image, a node of the pipeline image includes a pipeline node and a user node, the importance degree of the at least one faulty pipeline is determined by weighting based on importance degrees of users corresponding to user nodes of different routes, wherein a weighting coefficient is a route coefficient of the pipeline image and the larger the route coefficient, the higher the importance degree of the at least one faulty pipeline, the route coefficient is positively related to a route length of the pipeline image, the route length refers to adjacency between a starting node and an ending node of a route of the pipeline image, wherein the adjacency refers to a count of nodes that need to be traversed in the pipeline image from one node to another node; the future pipeline data includes a maintenance fault type and a maintenance fault probability of the at least one faulty pipeline;
determining the maintenance fault probability based on a preset algorithm in response to a determination that a count of the maintenance fault type is greater than or equal to two; wherein a final maintenance fault probability of the at least one faulty pipeline is determined by weighting maintenance fault probabilities corresponding to different maintenance fault types of the at least one faulty pipeline using the preset algorithm; wherein a weighting coefficient is obtained from a coefficient table; and the coefficient table is a table that reflects combinations of maintenance fault types and corresponding coefficients; when a plurality of candidate maintenance schemes meet the preset fault condition, determining a candidate maintenance scheme with a maximum count of non-stop transmission with pressure maintenance approaches as the recommended maintenance approach; and
determining a set of monitoring point locations based on the recommended maintenance approach, wherein the set of monitoring point locations includes a set of preset point locations and a set of expanded point locations; and
determining a regulation parameter of a regulation device based on monitoring data of the set of monitoring point locations obtained in real time or intermittently from a plurality of gas meters, flow meters, manometers configured in the smart gas object platform, wherein an output of a regulation parameter determination model includes a preset identifier, and suspending a construction scheme and re-determining the recommended maintenance approach in response to a determination that the output of the regulation parameter determination model is the same as the preset identifier;
determining the construction scheme based on the recommended maintenance approach;
obtaining the monitoring data through the monitoring device based on the construction scheme; and
determining, based on a second pipeline network graph, the regulation parameter using the regulation parameter determination model, wherein the regulation parameter determination model is a graph neural networks (GNN), a node of the second pipeline network graph includes a gas pipeline, the monitoring device, and the regulation device, and a node feature includes a gas pipeline node feature, a monitoring device node feature, and a regulation device node feature; and the monitoring device node feature of the node includes the monitoring data; an edge of the second pipeline network graph includes a first-class edge, a second-class edge, and a third-class edge, and the edge is a directed edge; the first-class edge includes a connection relationship between the gas pipelines; a direction of the first-class edge signifies a direction of gas flow within the gas pipelines; an edge feature of the first-class edge represents a distance between gas pipeline nodes; the second-class edge includes a connection relationship between the monitoring device and the gas pipelines; and an edge feature of the second-class edge represents a monitoring relationship between the monitoring device and the gas pipelines; the third-class edge represents a connection relationship between the regulation device and the gas pipelines, and an edge feature of the third-class edge represents a regulation relationship between the regulation device and the gas pipelines; wherein
the regulation parameter determination model is obtained by training using a second training samples and second labels; the second training samples include a sample second pipeline network graph, and the second labels include an actual regulation parameter and the preset identifier corresponding to the second training samples;
at regular intervals, determining the regulation parameter using the regulation parameter determination model; and
perform real-time regulation of the regulation device by regulating the gas flow rate, a gas flow volume, and a pipeline pressure of the at least one faulty pipeline and a related pipeline based on the determination of the regulation parameter.

2. The method of claim 1, wherein the regulation parameter determination model includes a point location determination layer and a regulation determination layer, and the method further comprises:
  determining the set of expanded point locations through the point location determination layer based on the second pipeline network graph; wherein the point location determination layer is obtained by training based on a plurality of third training samples and third labels; the plurality of third training samples include sample second pipeline network graphs, and the third labels are sample sets of monitoring locations; wherein a plurality of candidate monitoring locations where a fluctuation of the gas data occurs is selected as the sample sets of monitoring locations by presetting a plurality of candidate monitoring locations and changing the gas data based on the sample second pipeline network graphs;

determining a second updated graph by updating the second pipeline network graph based on the set of expanded point locations; and determining the regulation parameter and the preset identifier through the regulation determination layer based on the second updated graph; wherein the regulation determination layer is obtained by training based on a plurality of fourth training samples and fourth labels; the fourth training samples are sample second updated graphs, and the fourth labels are an actual regulation parameter and the preset identifier; wherein a candidate regulation parameter that meets a safety condition or has a minimal fluctuation is selected as the fourth label by presetting a plurality of candidate regulation parameters based on the sample second updated graphs; or when no candidate regulation parameter meets the safety condition, the fourth label is the preset identifier and the preset identifier is a text identifier "Exceeds Regulation Capacity".

3. A system for regulating pipeline network maintenance based on a smart gas Internet of Things (IoT), comprising a smart gas user platform, a smart gas service platform, a smart gas safety management platform, a smart gas sensing network platform, and a smart gas object platform interacting in sequence; wherein the smart gas safety management platform includes a smart gas emergency maintenance management sub-platform and a smart gas data center;

the smart gas sensing network platform is configured to interact with the smart gas data center and the smart gas object platform;

the smart gas user platform is configured as a terminal device, the smart gas object platform is configured as various types of gas-related devices, the gas-related devices include a monitoring device and a regulation device; the monitoring device includes a gas meter, a flow meter, a manometer, a temperature sensor, a humidity sensor, and a pressure sensor; the smart gas object platform is configured to transmit collected information through the smart gas sensing network platform to the smart gas data center;

the system further comprises:

a non-transitory computer-readable storage medium storing a computer instruction; and at least one processor in communicate with the non-transitory computer-readable storage medium; when executing the computer instruction, the at least one processor is directed to cause the system to:

obtain gas data of at least one faulty pipeline from the gas meter, the flow meter, and the manometer of the smart gas object platform based on the smart gas sensing network platform, wherein the gas data includes at least one of a gas flow rate, a gas flow volume, and a pipeline pressure of the at least one faulty pipeline;

generate at least one set of candidate maintenance schemes based on the at least one faulty pipeline;

predict future pipeline data of the at least one faulty pipeline at a future time point through a prediction model based on a first pipeline network graph and the at least one set of candidate maintenance schemes, the prediction model being a graph neural networks (GNN); wherein the prediction model is obtained by training based on first training samples and first labels, the first training samples are historical first pipeline network graphs constructed based on historical data from a first time period, and the first labels are actual pipeline data of a set of monitoring point locations in the historical data from a second time period; wherein the first time period precedes the second time period, the second time period is a future time period of the first time period, and the training includes:

inputting the first training samples with the first labels into an initial prediction model;

constructing a loss function based on outputs of the initial prediction model and the first labels;

updating parameters of the initial prediction model based on the loss function until meeting preset conditions; and obtaining the prediction model;

determine a recommended maintenance approach for the at least one faulty pipeline based on the future pipeline data and a preset fault condition; wherein the recommended maintenance approach includes a non-stop transmission with pressure maintenance approach and a stop transmission maintenance approach; the preset fault condition is a maintenance fault probability of each faulty pipeline corresponding to each candidate maintenance scheme that is less than a fault threshold; the fault threshold is inversely related to an importance degree of the at least one faulty pipeline; wherein the importance degree of the at least one faulty pipeline is determined based on a pipeline image, a node of the pipeline image includes a pipeline node and a user node, the importance degree of the at least one faulty pipeline is determined by weighting based on importance degrees of users corresponding to user nodes of different routes, wherein a weighting coefficient is a route coefficient of the pipeline image and the larger the route coefficient, the higher the importance degree of the at least one faulty pipeline, the route coefficient is positively related to a route length of the pipeline image, the route length refers to adjacency between a starting node and an ending node of a route of the pipeline image, wherein the adjacency refers to a count of nodes that need to be traversed in the pipeline image from one node to another node; the future pipeline data includes a maintenance fault type and a maintenance fault probability of the at least one faulty pipeline;

determine the maintenance fault probability based on a preset algorithm in response to a determination that a count of the maintenance fault type is greater than or equal to two; wherein a final maintenance fault probability of the at least one faulty pipeline is determined by weighting maintenance fault probabilities corresponding to different maintenance fault types of the at least one faulty pipeline using the preset algorithm; wherein a weighting coefficient is obtained from a coefficient table; and the coefficient table is a table that reflects combinations of maintenance fault types and corresponding coefficients; when a plurality of candidate maintenance schemes meet the preset fault condition, determining a candidate maintenance scheme with a maximum count of non-stop transmission with pressure maintenance approaches as the recommended maintenance approach;

determine a set of monitoring point locations based on the recommended maintenance approach, wherein the set of monitoring point locations includes a set of preset point locations and a set of expanded point locations;

determine a regulation parameter of a regulation device based on monitoring data of the set of monitoring point locations obtained in real time or intermittently from a plurality of gas meters, flow meters, manometers configured in the smart gas object platform, wherein an output of a regulation parameter determination model includes a preset identifier, and suspend a construction scheme and re-determining the recommended maintenance approach in response to a determination that the output of the regulation parameter determination model is the same as the preset identifier;

determine the construction scheme based on the recommended maintenance approach;

obtain the monitoring data through the monitoring device based on the construction scheme; and determine, based on a second pipeline network graph, the regulation parameter using the regulation parameter determination model, wherein the regulation parameter determination model is a graph neural networks (GNN), a node of the second pipeline network graph includes a gas pipeline, the monitoring device, and the regulation device, and a node feature includes a gas pipeline node feature, a monitoring device node feature, and a regulation device node feature; and the monitoring device node feature of the node includes the monitoring data; an edge of the second pipeline network graph includes a first-class edge, a second-class edge, and a third-class edge, and the edge is a directed edge; the first-class edge includes a connection relationship between the gas pipelines; a direction of the first-class edge signifies a direction of gas flow within the gas pipelines; an edge feature of the first-class edge represents a distance between gas pipeline nodes; the second-class edge includes a connection relationship between the monitoring device and the gas pipelines; and an edge feature of the second-class edge represents a monitoring relationship between the monitoring device and the gas pipelines; the third-class edge represents a connection relationship between the regulation device and the gas pipelines, and an edge feature of the third-class edge represents a regulation relationship between the regulation device and the gas pipelines; wherein the regulation parameter determination model is obtained by training using a second training samples and second labels; the second training samples include a sample second pipeline network graph, and the second labels include an actual regulation parameter and the preset identifier corresponding to the second training samples;

at regular intervals, determine the regulation parameter using the regulation parameter determination model;

the smart gas service platform is configured to send the regulation parameter to the smart gas user platform; and perform real-time regulation of the regulation device by regulating the gas flow rate, a gas flow volume, and a pipeline pressure of the at least one faulty pipeline and a related pipeline based on the determination of the regulation parameter.

4. The system of claim 3, wherein the regulation parameter determination model includes a point location determination layer and a regulation determination layer, and at least one processor is further directed to cause the system to:

determine the set of expanded point locations through the point location determination layer based on the second pipeline network graph; wherein the point location determination layer is obtained by training based on a plurality of third training samples and third labels; the plurality of third training samples include sample second pipeline network graphs, and the third labels are sample sets of monitoring locations; wherein a plurality of candidate monitoring locations where a fluctuation of the gas data occurs is selected as the sample sets of monitoring locations by presetting a plurality of candidate monitoring locations and changing the gas data based on the sample second pipeline network graphs;

determine a second updated graph by updating the second pipeline network graph based on the set of expanded point locations; and determine the regulation parameter and the preset identifier through the regulation determination layer based on the second updated graph; wherein the regulation determination layer is obtained by training based on a plurality of fourth training samples and fourth labels; the fourth training samples are sample second updated graphs, and the fourth labels are an actual regulation parameter and the preset identifier; wherein a candidate regulation parameter that meets a safety condition or has a minimal fluctuation is selected as the fourth label by presetting a plurality of candidate regulation parameters based on the sample second updated graphs; or when no candidate regulation parameter meets the safety condition, the fourth label is the preset identifier and the preset identifier is a text identifier "Exceeds Regulation Capacity".

5. A non-transitory computer-readable storage medium storing a computer instruction, wherein when executing the computer instruction in the non-transitory computer-readable storage medium, a computer implements the method of claim 1.

6. The method of claim 2, wherein the method further comprises:

periodically re-determining the set of expanded point locations at a first preset interval through the point location determination layer;

periodically re-determining the second updated graph by updating the second pipeline network graph based on the set of expanded point locations at the second preset interval; and periodically re-determining the regulation parameter at the second preset interval through the regulation determination layer.

7. The method of claim 2, further comprises:

determining whether to suspend the construction scheme based on a fluctuation of the monitoring data.

8. The method of claim 7, wherein the determining whether to suspend the construction scheme based on a fluctuation of the monitoring data comprises:

during the maintenance process, obtaining monitoring data for n times denoted as monitoring data 1, monitoring data 2, monitoring data 3, . . . , and monitoring data n, and selecting a time duration of x; calculating a variance of the monitoring data 1 to monitoring data x; wherein the variance is calculated in real-time during data collection process;

when the variance is greater than a preset threshold, indicating that the fluctuation of the monitoring data during the time period is high; in response to the fluctuation of the monitoring data being high, notifying maintenance personnel to suspend the maintenance process through the smart gas emergency maintenance management sub-platform, allowing the maintenance personnel to wait for the regulation parameter determination model to re-output the regulation parameter or performing a manual inspection;

when the variance is less than the preset threshold, continuing to calculate the variance of monitoring data (1+y) to monitoring data (x+y) with a step size of y; and continuously monitoring the fluctuation of the monitoring data in real-time during the maintenance process and determining whether to suspend the construction scheme.

\* \* \* \* \*